Patented Aug. 22, 1944

2,356,443

UNITED STATES PATENT OFFICE 2,356,443

METHOD OF MAKING A COMPOSITION FOR USE IN DETERGENTS

Harry Gerard Bissinger, Denville, N. J., assignor to Drew Associates, Inc., New York, N. Y., a corporation No Drawing. Application July 16, 1940, Serial No. 345,859

9 Claims. (Cl. 252—158)

This invention is directed to compositions of alkaline nature adapted for use directly for detergent purposes in a laundry or the like, more particularly to products containing up to about 80% of free caustic alkali.

Caustic soda possesses three disadvantageous physical properties, namely: one, caking when exposed to the atmosphere; two, rapidly picking up moisture when exposed to the atmosphere; and three, burning the hands. When caustic soda is admixed with other products, even in small percentages, it imparts these disadvantageous physical properties to the product into which it has been incorporated, to an extent commensurate with the percent of caustic soda incorporated therein.

Numerous attempts have been made to produce a product containing a high percent of caustic soda that would not possess, to as great an extent as would be expected from the percent of caustic soda contained therein, the above stated disadvantageous physical properties of caustic soda. However, prior to this invention no one has been able to accomplish this result to as great an extent as is accomplished by this invention.

In recent years, it has become rather common practice in the commercial laundry industry to use alkaline materials in the washing operations. Soda ash had been used to a great extent, but it has been largely supplanted by more highly caustic types of alkalies. Silica has been combined with caustic soda to overcome the disadvantageous properties of caustic soda and while the silica does to some degree diminish the disadvantageous physical properties of caustic soda, it does not diminish them to as great a degree as is accomplished by the present invention. Proof of this is the fact that highly alkaline silicate of soda, such as sodium ortho silicate, must be packed in steel drums and cannot be packed in wood barrels as the caustic soda will attack the wood whereas the product covered by the present invention is packed in wood barrels and will not attack the wood, even though the percent of caustic soda contained therein is higher than that present in sodium ortho silicate. Another disadvantage of the use of silica to overcome the disadvantageous properties of caustic soda is that silica is inert in washing value and silicate of soda is, therefore, not as economically sound as the present product because the latter contains no inert matter. Furthermore, some compounds were highly caustic so that unless the operators were extremely careful not to allow the same to touch the skin, burns resulted therefrom. Also, in the washing operation, silica becomes deposited upon fabrics and tends to injure them.

The present invention is intended and adapted to overcome the difficulties and disadvantages heretofore encountered in compositions of the above-mentioned character and to provide a composition which has a high degree of effectiveness when used directly as a detergent, and which is relatively non-caustic and may be handled carefully without detrimental effects.

Another object of this invention is the production of a product containing caustic alkali that does not possess to as great a degree as caustic alkali, the disadvantageous physical properties of caustic alkali.

The present invention is based upon a procedure involving the utilization of caustic soda. A composition is made by providing powdered caustic alkali, preferably sodium hydroxide and combining the same with a glyceride oil in such a manner that the particles of the alkali are coated with a thin layer or film of oil and there is an intermediate layer or film consisting of a salt of a fatty acid encasing each of the particles of caustic alkali. Thereby, the highly caustic character of the greater proportion of the alkali is retained, but it is externally covered so that handling thereof does not injure an operator's hands. At the same time, in solution, because of the presence of soap, the film of oil is very readily emulsified and thus dissolved, releasing the alkali to exert its full effect in the cleansing operation. In storage, even on exposure to atmospheric moisture, the outer oil film acts as a moisture-repellant and prevents the inner soap film and the caustic alkali itself from coming in contact with moisture. The amount of oil used is generally 15 to 25% by weight of the caustic soda.

Because the alkali is available as free hydroxide instead of being combined with carbon dioxide, silicate or the like, the product covered by the present invention is more active as a detergent composition. Alternately, if desired, the composition may be used in a soap making operation in the laundry or elsewhere, so that the compositions of the present invention have two diverse but related uses, both of them being of considerable importance in the field.

The following are examples of the operation of the present invention:

*Example I*

A mixture is made of mineral oil, usually a fuel fraction having an end boiling point of 475° F. in the proportion of 20 parts by weight thereof with two parts by weight of cresylic acid. To this is added one part by weight of a suitable sulpho base, such as sulphonic acid.

There is also provided 100 parts by weight of a suitable vegetable oil, such as cotton seed oil, the same being heated to a temperature of from 75–100° F. It is stirred with a suitable mixing device and the mixture of mineral oil, cresylic acid and sulpho base added to uniformly incorporate the two mixtures. Thereupon, 500 parts by weight of powdered caustic soda is added rapidly with vigorous stirring until a smooth paste is formed. This is continued for about ten minutes, at the end of which the mixture has passed through a lumpy stage and becomes coarsely granular. During the mixing operation a strong current of a gas, such as air is passed through the apparatus in order to rapidly cool the mass.

Mixing is continued for a total of about thirty minutes, after which the mass is removed from the apparatus and spread in a thin layer upon a cement floor for curing or ripening, to allow ready dissipation of the heat of reaction. This is allowed to continue for about eighteen hours, during which time the temperature rises to a substantial degree, indicating a reaction taking place, and then the temperature gradually falls to normal atmospheric temperature. It is important to allow the temperature to fall before attempting to package the product, as otherwise the heat developed in the package tends to char and blacken the mass. After it is cool, the product is ground and packaged for sale.

*Example II*

Place eighty parts by weight of commercial powdered caustic soda and twenty parts by weight of crude soya bean oil in a mixer. Mix rapidly until each caustic soda particle is coated with a film of oil. The objective of the mixing is to, as quickly as possible, coat each caustic soda particle with a film of oil before saponification occurs. Thereby, substantially complete coating of the alkali is obtained before the formation of the films of soap on the particles. This insures good protection of the alkali even with minimum amounts of oil. A batch type or continuous type mixer may be used. The mixture may be run in the mixer until saponification is completed and then run through a grinder or sifter into packages. Preferably, the mixture may be taken from the mixer as soon as each particle of caustic soda is coated with an oil film, stored until saponification is completed, and then run through a grinder or sifter into packages.

The finished product remains stable because the fatty acid salt is salted out at the interface of the caustic soda and fatty acid salt which prevents the caustic soda from sweating through the fatty acid salt and thereby becoming exposed to the atmosphere.

The resultant product produced in the above manner may have a tendency to be dusty. I have found that by mixing mineral oil with the saponifiable oil, prior to mixing with the caustic soda, in an amount that will result in a mineral oil content of about 3% in the final product, this dusting is completely eliminated.

There is a very slight amount of moisture present in the ingredients and this acts as a catalyst in promoting a reaction between the particles of alkali and the oil, forming a film of soap and upon the same a film of oil, thereby preventing exposure of alkali to atmospheric conditions. The saponification of the oil by the caustic soda is so slow when both ingredients are substantially free from water, as in the present case, that each particle of the alkali becomes more or less perfectly coated with the film. Moderate heat is generated during the reaction, indicating that such reaction is somewhat limited.

Considering the fact that the final product contains approximately 80% of caustic soda, it is preserved remarkably well, even when fully exposed to the atmosphere. It does not take up moisture, does not burn the hands to as great an extent as would be expected from a product having such a high caustic content. Furthermore, the product in solution does not form any insoluble residues. In the powdered state the product does not tend to raise any dust, and therefore does not have a tendency to attack the mucous membranes of the nose and throat. There is little tendency to cake on exposure and there is no material amount of absorption of moisture from the air.

Although I have described two specific embodiments of the present invention, it will be understood by those skilled in the art that such examples were given for purposes of illustration and they do not limit the invention involved herein. While soya bean oil and cotton seed oil were the only oils mentioned specifically, any of the known glyceride oils or fats, either of vegetable or animal origin, may be used. I may use any crude or refined saponifiable fatty glyceride. I do not confine this invention to the use of a fatty glyceride as I might use any saponifiable fatty acid. However, the use of a saponifiable fatty glyceride is preferable as saponification takes place more slowly when a fatty glyceride is used than when a fatty acid is used and it is, therefore, easier to coat each particle of caustic soda with an oil film before saponification occurs, when a fatty glyceride is used. I may also use a sulphonic acid.

There may also be added to the compositions substances in the nature of buffers, oils, solvents, antiseptics, and the like. Also, I may add to the product, either prior to mixing with the oil or after mixing with the oil, various alkaline substances such as sodium carbonate, trisodium phosphate, sodium pyro phosphate, sodium hexametaphosphate, sodium silicate, borax, or potassium alkalies, or any substance, including sulphonated fatty alcohols, which would improve the detergent or water softening properties of the product. I may also incorporate into the product bleaching agents, such as sodium perborate, sodium peroxide, sodium hypochlorite or hydrogen peroxide. Soap may be mixed with the final product.

Instead of caustic soda, caustic potash may be used. Solvents of various types, such as the well known Cellosolve, the ethyl ether of ethylene glycol, may be incorporated in the composition. This invention is not limited to the use of mineral oil as I may use any unsaponifiable oil or solvent such as kerosene, gasoline, carbon tetrachloride, naphtha, hexalin, toluol, etc., or I may obtain the anti-dusting effect by means of a sulphonated oil, such as sulphonated castor oil. The exact procedure for the incorporation of the oil with the alkali may be varied, as for example one may atomize the oil onto the powdered alkali or the two may be simultaneously sprayed into a suitable chamber to give the desired combinations.

What I claim is:

1. A method of making a composition for use in a detergent which comprises providing alkali metal hydroxide in the form of particles, adding thereto an oil of the higher fatty acid-glyceride type, the amount of said oil being sufficient to form a thin film on said alkali but insufficient to cause adherence of the particles of said alkali, mixing said oil and alkali in the presence of sufficient moisture to cause an exothermic reaction to take place to form an intermediate layer of soap which is salted out at the interface, and spreading said composition in thin layers to allow cooling thereof without charring.

2. A method of making a composition for use in a detergent which comprises providing alkali metal hydroxide in the form of particles, adding thereto an oil of the higher fatty acid-glyceride type, the amount of said oil being sufficient to form a thin film on said alkali but insufficient to cause adherence of the particles of said alkali, heating said oil to a temperature of about 75-100 degrees F., mixing said oil and alkali in the presence of sufficient moisture to cause an exothermic reaction to take place to form an intermediate layer of soap which is salted out at the interface, and spreading said composition in thin layers to allow cooling thereof without charring.

3. A method of making a composition for use in a detergent which comprises providing alkali metal hydroxide in the form of particles, adding thereto an oil of the higher fatty acid-glyceride type, the amount of said oil being sufficient to form a thin film on said alkali but insufficient to cause adherence of the particles of said alkali, mixing said oil and alkali in the presence of sufficient moisture to cause an exothermic reaction to take place to form an intermediate layer of soap which is salted out at the interface, allowing the composition to stand until the same becomes brittle, and then subdividing the same.

4. A method of making a composition for use in a detergent which comprises providing alkali metal hydroxide in the form of particles, adding thereto an oil of the higher fatty acid-glyceride type, the amount of said oil being from 15 to 25% by weight based on the alkali present, mixing said oil and alkali in the presence of sufficient moisture to cause an exothermic reaction to take place to form an intermediate layer of soap which is salted out at the interface, spreading said composition in thin layers to allow cooling thereof without charring.

5. A method of making a composition for use in a detergent which comprises providing an oil of the higher fatty acid-glyceride type, adding thereto an amount of alkali metal hydroxide particles substantially greater than the amount of oil present, the amount of oil being sufficient to coat the particles of alkali but insufficient to cause adherence of the particles of the product, strongly stirring said mixture to cause rapid and complete mixing, and continuing the stirring until the mixture becomes granular.

6. A method of making a composition for use in a detergent which comprises providing an oil of the higher fatty acid-glyceride type, adding thereto an amount of alkali metal hydroxide particles substantially greater than the amount of oil present, the amount of oil being sufficient to coat the particles of alkali but insufficient to cause adherence of the particles of the product, strongly stirring said mixture to cause rapid and complete mixing, continuing the stirring until the mixture becomes granular, and applying a strong blast of cool gas thereto during said mixing to rapidly cool the same.

7. A method of making a composition for use in a detergent which comprises providing an oil of the higher fatty acid-glyceride type, adding thereto an amount of alkali metal hydroxide particles substantially greater than the amount of oil present, the amount of oil being sufficient to coat the particles of alkali but insufficient to cause adherence of the particles of the product, strongly stirring said mixture to cause rapid and complete mixing, continuing the stirring until the mixture becomes granular, and then spreading the mass in a relatively thin layer for a sufficient period of time during which the temperature rises and then decreases to substantially normal temperature.

8. A method of making a composition for use in a detergent which comprises providing an oil of the higher fatty acid-glyceride type, mixing therewith a sulphonic acid capable of splitting glyceride oils, adding thereto an amount of alkali metal hydroxide particles substantially greater than the amount of oil present, the amount of oil being sufficient to coat the particles of alkali but insufficient to cause adherence of the particles of the product, strongly stirring said mixture to cause rapid and complete mixing, and continuing the stirring until the mixture becomes granular.

9. A method of making a composition for use in a detergent which comprises providing an oil of the higher fatty acid-glyceride type, mixing therewith a minor proportion of a fuel fraction of mineral oil sufficient to prevent dusting, adding thereto an amount of alkali metal hydroxide particles substantially greater than the amount of oil present, the amount of oil being sufficient to coat the particles of alkali but insufficient to cause adherence of the particles of the product, strongly stirring said mixture to cause rapid and complete mixing, and continuing the stirring until the mixture becomes granular.

HARRY GERARD BISSINGER.